(12) United States Patent
Silverman et al.

(10) Patent No.: US 7,593,950 B2
(45) Date of Patent: Sep. 22, 2009

(54) ALBUM ART ON DEVICES WITH RULES MANAGEMENT

(75) Inventors: Andrew L. Silverman, Redmond, WA (US); Kipley J. Olson, Mercer Island, WA (US)

(73) Assignee: Microsoft Corporation, Redmond, WA (US)

( * ) Notice: Subject to any disclaimer, the term of this patent is extended or adjusted under 35 U.S.C. 154(b) by 189 days.

(21) Appl. No.: 11/094,097

(22) Filed: Mar. 30, 2005

(65) Prior Publication Data
US 2006/0230038 A1   Oct. 12, 2006

(51) Int. Cl.
*G06F 17/00* (2006.01)
*G06Q 10/00* (2006.01)

(52) U.S. Cl. .......................................... 707/101; 705/1
(58) Field of Classification Search ................... 705/51, 705/56, 1
See application file for complete search history.

(56) References Cited

U.S. PATENT DOCUMENTS

| | | | |
|---|---|---|---|
| 5,726,898 A | 3/1998 | Jacobs | |
| 5,796,967 A * | 8/1998 | Filepp et al. | 715/764 |
| 6,226,618 B1 * | 5/2001 | Downs et al. | 705/1 |
| 6,560,651 B2 * | 5/2003 | Katz et al. | 709/229 |
| 2002/0157002 A1 * | 10/2002 | Messerges et al. | 713/155 |
| 2003/0079038 A1 * | 4/2003 | Robbin et al. | 709/232 |
| 2004/0045027 A1 | 3/2004 | Takamura et al. | |
| 2004/0225519 A1 * | 11/2004 | Martin | 705/1 |

* cited by examiner

*Primary Examiner*—John R. Cottingham
*Assistant Examiner*—Nirav K Khakhar
(74) *Attorney, Agent, or Firm*—Senniger Powers LLP

(57) ABSTRACT

A system and method for transferring album art from a client computer to a portable media device (PMD). A graphical user-interface allows a user to select a track for transfer to the PMD. A media player application (MPA) verifies that the PMD is capable and authorized to receive album art. The MPA queries the PMD for an album object storing album art for the selected track. If an album object corresponding to the selected track exists, a reference to the selected track is added to the existing album object. If an album object corresponding to the selected track does not exist, the MPA transfers a new album object referencing the selected track and storing album art for the selected track to the PMD. The MPA further connects to a web site authorized to sell an audio CD associated with a track when a buy flag is detected on the PMD.

15 Claims, 9 Drawing Sheets

ALBUM ART ON DEVICES WITH RULES MANAGEMENT

TECHNICAL FIELD

The present invention relates to the field of processing digital media content. In particular, this invention relates to an improved system and method for transferring premium metadata for media content between media devices.

BACKGROUND OF THE INVENTION

Due to recent advances in technology, computer users are now able to enjoy many features that provide an improved user experience, such as playing various media and multimedia content on their personal or laptop computers. For example, most computers today are able to play compact discs (CDs) so users can listen to their favorite musical artists while working on their computers. Many computers are also equipped with digital versatile disc (DVD) drives enabling users to watch movies.

In some multimedia environments, a computer has access to a computer-readable medium storing compressed media files. Common media file types include Moving Picture Experts Group audio layer-3 (MP3) files and WINDOWS MEDIA® technologies audio (WMA) and video (WMV) files. The computer typically organizes the media files into playlists when the compressed media files are played on the computer. The files may be organized according to metadata or other property data associated with the media content. Metadata for a digital media file such as an audio file usually includes general information pertaining to the media file itself. This information is typically stored within the file. For example, an audio file may have metadata tags for the song title, song artist, album title, and a rating. In another example, in the case of audio media files, the files may be organized by album, artist, genre, date, or some user-specified selection and ordering of metadata. A user navigates through this organization using menus and graphical displays to render the desired media files.

Often, users transfer media content from a personal computer to a variety of other devices including another personal computers or portable consumer electronic media devices (e.g., MP3 players). Many of these portable media devices are beginning to have color displays that can display a rich user interface for interacting with the media on the device. Because premium metadata such as album art is an important part of the media experience on the desktop, it is important to seamlessly integrate album art on such portable media devices in order to provide a complementary experience to the desktop. However, copyright restrictions regarding the use of such premium metadata should be respected.

Accordingly, a system for transferring premium metadata associated media files while respecting the copyright restrictions with respect to such premium metadata is desired to address one or more of these and other disadvantages.

SUMMARY OF THE INVENTION

The invention meets the above needs and overcomes one or more deficiencies in the prior art by providing improved user experience when transferring premium metadata associated with various media files from a computer to a portable media device. More specifically, the invention provides a system that provides improved management of metadata by enhancing copyright protection and a user's experience when transferring a media file from a client computer to a portable media device. The present invention also permits the user to purchase premium metadata or physical goods such as audio CD's associated with a particular media file by automatically connecting to a web site authorized to sell the desired audio CD when a buy flag is detected on the portable media device.

In accordance with an aspect of the invention, a computer-readable medium includes computer executable instructions for transferring graphical information from a computer to a portable media device. A user interface is provided for identifying a track to be transferred to the portable media device. Retrieving instructions retrieve graphical information corresponding to the identified track. Determining instructions determine whether an album object is stored in the portable media device. The album object stores property data corresponding to the identified track and the retrieved graphical information. Creating instructions create a new album object when the determining indicates that an existing album object is not stored in the portable media device. Transferring instructions transfer the new album object and identified track to the portable media device when the determining indicates that the album object is not stored in the portable media device.

In accordance with another aspect of the invention, a method is provided for transferring graphical information from a computer to a portable media device. The method includes presenting a user interface for identifying a media file to be transferred to the remote computer. The media file has a metadata field that includes property data. The method also includes retrieving graphical information corresponding to the identified media file. The method also includes determining whether an album object is stored in the remote computer. The album object stores property data corresponding to the identified media file and the retrieved graphical information. The method further includes creating the album object when the determining indicates that the album object is not stored in the remote computer. The method further includes transferring the created album object and identified media file to the portable media device when the determining indicates that the album object is not stored in the remote computer.

In accordance with another aspect of the invention, a computer-readable media having a searchable data structure is provided. The data structure includes a first field for storing data representing graphical information associated with an album. The data structure also includes a second field for storing data representing one or more tracks associated with the album. The graphical information included in the first field is associated with each of the one or more tracks stored in the second field.

Alternatively, the invention may comprise various other methods and apparatuses.

Other features will be in part apparent and in part pointed out hereinafter.

BRIEF DESCRIPTION OF THE DRAWINGS

Corresponding reference characters indicate corresponding parts throughout the drawings.

DETAILED DESCRIPTION OF THE INVENTION

Figure 1A:
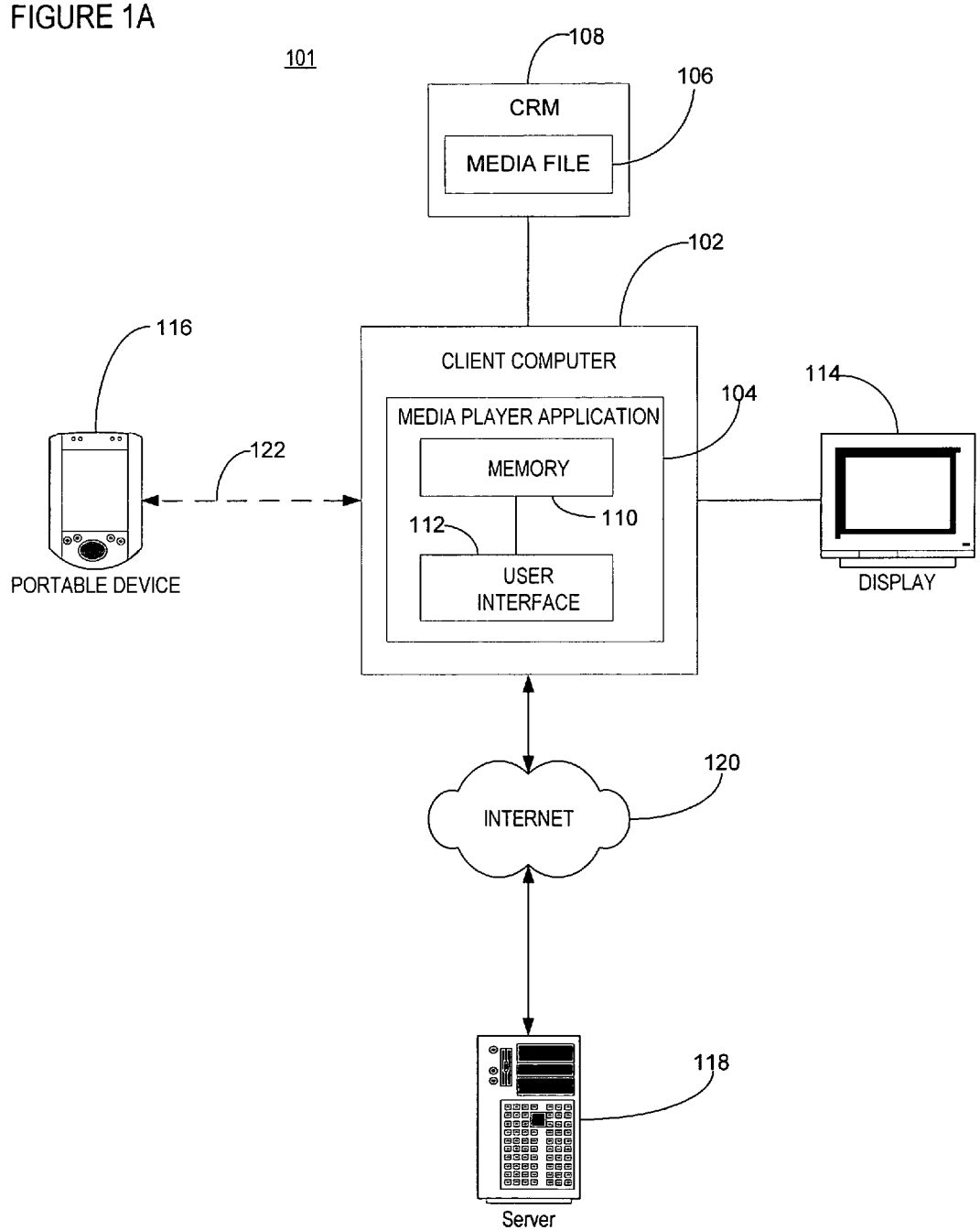
FIG. 1A is an exemplary computer system in which the present invention can be used.

Referring now to the drawings, FIG. 1A illustrates an exemplary computer system 101 in which the present invention can be used. System 101 includes a client computer 102 that executes a media player application (MPA) 104. The media player application 104 can be any suitable rendering filter or program that is configured to play digital media so that a user can experience the content embodied on the media. For example, suitable MPAs 104 include a CD media player application, a digitally-compressed-file player application, and/or a DVD media player application. Executing the MPA 104, allows the user to access a digital media file 106 on a computer-readable medium (CRM) 108 such as a compact disc, a network server, or any other suitable computer storage media. Executing the MPA 104 also enables the user or, particularly, enables MPA 104 to access, retrieve, store, and display for the user, so-called metadata. Those skilled in the art are familiar with metadata, which is simply information about data. In the context of the present invention, metadata involves information related to specific content of digital media file 106 being played via the MPA 104. Basic metadata may include one or more of album title, artist, performer, genre, description of content, and the like. Extended or premium metadata includes album art, performer biographies, reviews, related performers, where to buy similar items, upcoming concerts, ticket sales, URLs to other related experiences including purchase opportunities, and the like. The MPA 104 accesses a memory 110 for storing digital media files 106, and includes a graphical user interface 112 for displaying media files 106 and organized metadata to the user on a display 114, and for transferring media files 106 and organized metadata to a remote device such as a portable media device 116 communicatively connected to the computer 102.

In the examples herein, the media content of digital media file 106 refers to a single song track or a collection of tracks such as found on an audio CD. It is to be appreciated and understood that the media content can be embodied on any suitable media, including digital files downloaded to the client computer's memory, and that the specific examples described herein are given to further understanding of the inventive principles. The media content can include, without limitation, specially encoded media content in the form of, for example, an encoded media file 106 such as media content encoded in Microsoft® Windows Media™ format using the Microsoft® Windows Media™ Player program.

The system 101 allows improved management of metadata by enhancing copyright protection and user experience when transferring a media file 106 from the client computer 102 to a remote computing device such as a portable media device 116. More specifically, the present invention permits a user to purchase premium metadata or physical goods such as audio CD's associated with a particular media file by enabling a "buy now" flag while or after viewing album art on a display of the portable media device 116 during play back of the media file on the portable media device 116.

Figure 1B:
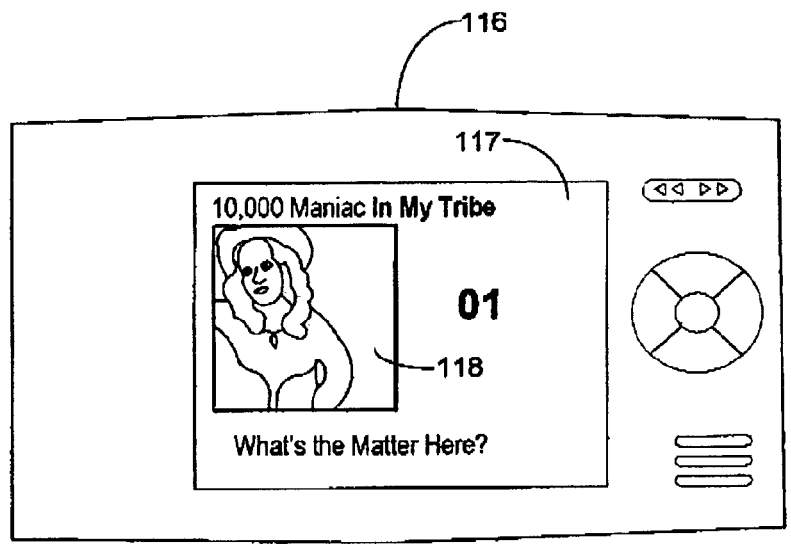
FIGS. 1B and 1C are exemplary screen shots of a display of a portable media device used in conjunction with the invention.
Figure 1C:
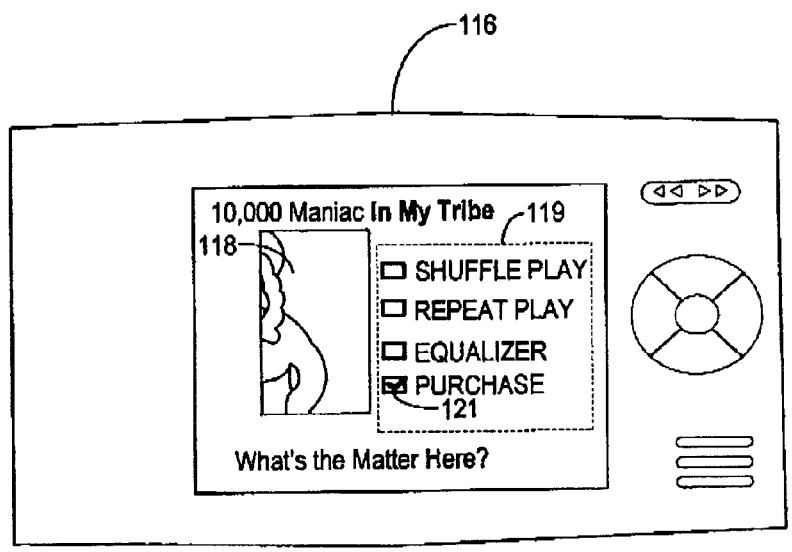

Referring briefly to FIG 1B, a screen shot illustrates a display 117 of an exemplary portable media device 116 configured to display album art and other metadata. In this instance, metadata such as the artist name "10,000 Maniacs," album title "In My Tribe,"track number "01," track title "What's the Matter Here?," and album art, as indicated by reference character 118, can be viewed on the display 117 of the portable media device 116. By using navigation tools (not shown) on the portable media device 116, the user can displace (i.e., slide over) the album art to view an options menu 119 on the display 117. The options menu 119 includes various options such as shuffle play, repeat play, equalizer, and purchase. (See FIG. 1C). Again using navigation tools on the portable media device 116, the user can select a check box 121 corresponding to the purchase option to indicate (i.e., flag) an intent to purchase this track/album, which is communicated back to the MPA 104.

As will be explained in greater detail in reference to FIG. 3 below, the buy now flag corresponds to a buy property value stored in the memory of the portable media device that indicates whether or not the user desires to purchase an audio CD corresponding to a transferred media file and/or premium property data and is assigned by the user of the portable media device 116. The next time the portable device 116 is connected to the client computer 102, as indicated by line 122, the MPA 104 detects the enabled "buy now" flag and connects to a web site authorized to sell the desired audio CD. For example, the MPA 104 detects the enabled "buy now" flag and communicates with a server 118 via the Internet 120 to display a web page (not shown) that allows the user to purchase the desired audio CD.

As described in more detail below in reference to FIG. 3A, the MPA 104 authenticates the portable device 116 by verifying that it is configured to operate in compliance with copyright restrictions and that the device is configured to display album art. After the portable media device 116 is authenticated, the MPA 104 creates an album object when transferring a first media file 106 associated with a particular album to the portable media device 116. The album object defines album metadata for each track on an album such as album name, artist name, and premium metadata such as album art data. By creating the album object, subsequent transfers of album property data for other media files 106 associated with the same album are not required, and thus, the amount of time and storage space required to transfer a different media file 106 from that same album is reduced as compared to the amount of time required for the first media file 106. For example, after a first track from the album entitled "Paradise," by Kenny G, is transferred to the portable media device 116, an album object is created that includes, in part, the name of the album as specified by metadata included in the first track (i.e., media file 106) and album art data. Thereafter, when a second track is being transferred, the media player application 104 can query data included in album objects stored in the memory of the portable media device 116 to determine if the name of the album as specified by metadata included in the first track matches the name of the album specified by metadata included in the album object. If a match is detected, the media player application 104 will not transfer album art to the portable media device 116 because the corresponding album art can be retrieved from the album object having metadata specifying the matching album name.

As a result, subsequent transfers of media files 106 from the same album occur faster, and premium metadata such as album art does not need to be retransmitted for each media file 106 from the same album. Thus, system 101 provides improved management of the transfer of media files 106 between a client computer 102 and portable media device 116 by permitting a user to simultaneously update and transfer premium metadata associated media files 106 while respecting the copyright restrictions with respect to such premium metadata.

Figure 2A:
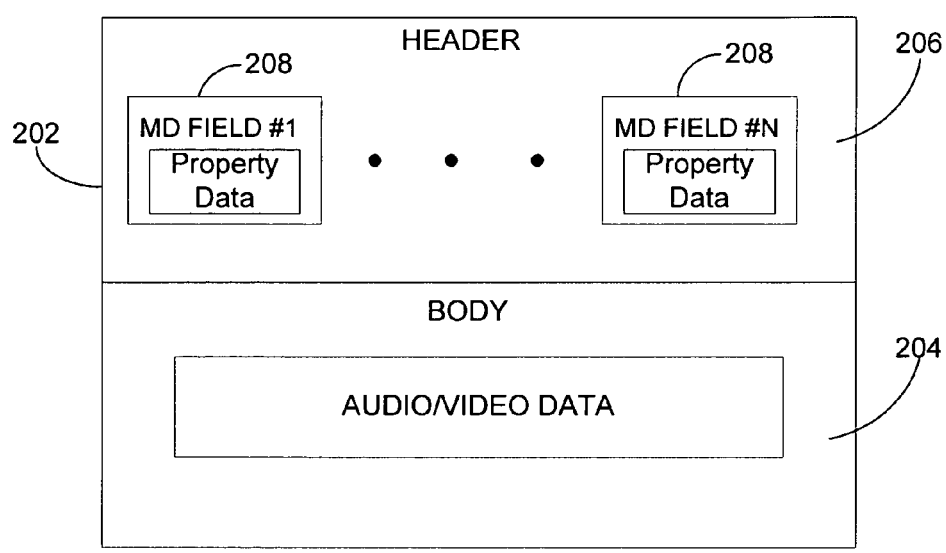
FIG. 2A is an exemplary block diagram illustrating the components of a media file.

Referring next to FIG. 2A, the components of an exemplary media file 202 (e.g., media file 106) are shown. In this case, the media file 202 represents a song track such as described above in reference to FIG. 1. The media file 202 includes a body section 204 and a header section 206. The body 206 stores digital audio information that is used by the MPA 104 to play the particular music track. Although the body 204 is described herein as storing digital audio information, it is contemplated that the body 204 of a media file 202 may include digital video information. The header 206 includes digital information, which is used by the MPA 104 to display information (i.e., metadata) about the particular music track. For example, the header 206 may include track information such as the song title, song artist, and album title for the work as stored metadata. The header 206 includes a plurality of metadata fields 208 that each store property data for a particular category of metadata. Property data defines a particular property that the media file 202 has within the particular metadata category. For instance, metadata field #1 may store information related to a genre category, and may have a property that indicates the genre is "Rock," or may have property that indicates the genre is both "Rock" and "Ballad."

Figure 2B:
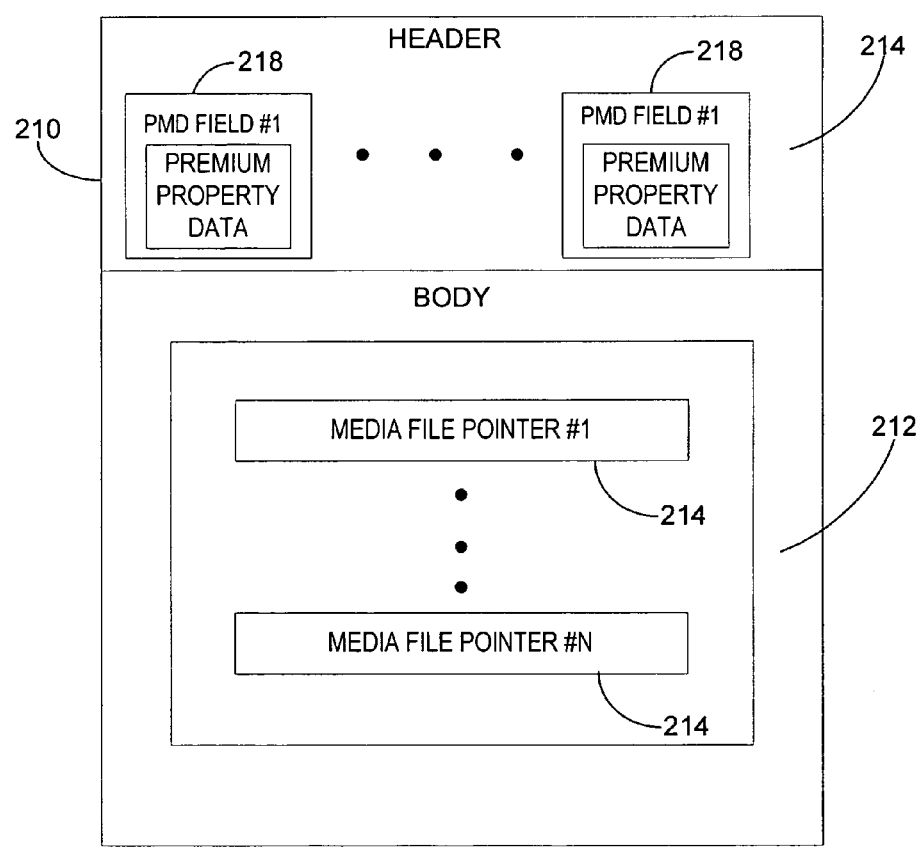
FIG. 2B is an exemplary block diagram illustrating the components of an album object.

Referring next to FIG. 2B, the components of an exemplary album object 210 are show. In this case, the album object 210 represents an album having one or more song tracks such as described above in reference to FIG. 1. The album object 210 includes a body section 212 and a header section 214. The body 212 includes one or more unique media file pointers 216 that each reference a particular track of the album stored on the portable media device 116. The media file pointers 216 are arranged in a sequence (e.g., media file pointer (1), media file pointer (2) . . . media file pointer (N that corresponds to the order the tracks appear on the album. For example, consider a portable media device 116 having five (5) tracks (i.e., media files) from a particular album. If the tracks on the portable media device 116 correspond to tracks 3, 2, 6, 1 and 10, from the album, five media file pointers 216 will be arranged as shown in Table 1.

TABLE 1

| TRACK NUMBER | MEDIA FILE POINTER |
| --- | --- |
| 1 | MEDIA FILE POINTER (1) |
| 2 | MEDIA FILE POINTER (2) |
| 3 | MEDIA FILE POINTER (3) |
| 6 | MEDIA FILE POINTER (4) |
| 10 | MEDIA FILE POINTER (5) |

Accordingly, the album object can store information for either a partial or complete album. The header 214 includes plurality of premium metadata fields 218 that each store premium property data for a particular category of premium metadata. For example, premium property data defines the graphical information (e.g., album art) associated with the tracks on a particular album. In addition, as described in more detail in reference to FIG. 3A below, the header 214 can also store a unique identification code that can be used to identify a particular album.

Figure 3A:
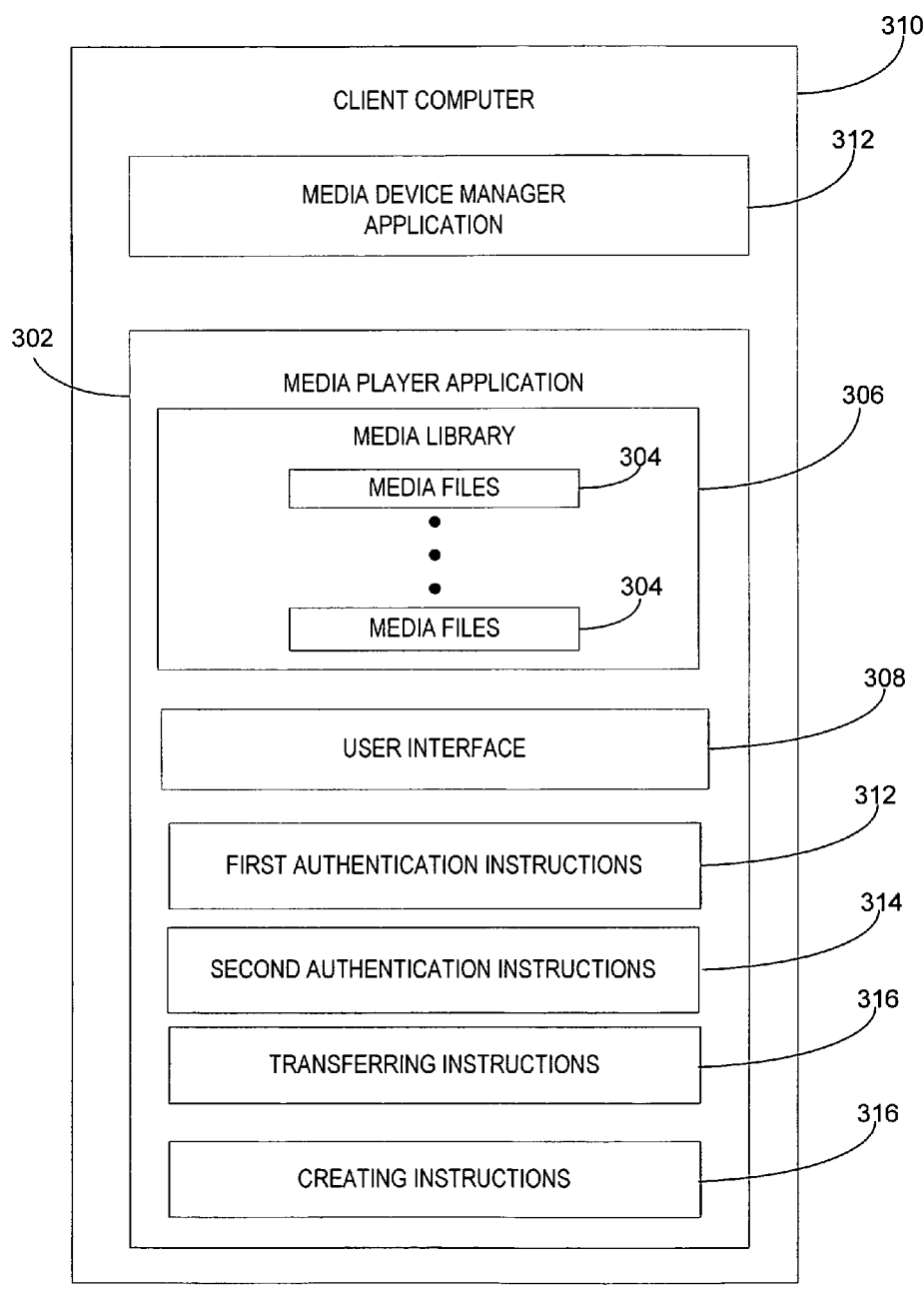
FIG. 3A is an exemplary block diagram illustrating components of a media player application according to one embodiment of the invention.

Referring next to FIG. 3A, an exemplary block diagram illustrates basic components of a MPA 302 (e.g., MPA 104) having computer executable instructions for storing and displaying media files 304 (e.g., media files 106), authenticating portable media devices for data transfer, and transferring data to portable media devices 116 according to one embodiment of the invention. The MPA 302 includes a media library 306 (e.g., memory 110) for storing media files 304, and a user interface (UI) 308 for displaying and allowing a user to interact with media files 304. In this embodiment, a client computer 310 (e.g., computer 102) stores and executes a media device manager application 312 and the MPA 302. The media device manager application 312 monitors the client computer 310 for connection to a portable media device 116. Notably, the connection may involve a wired connection such as a USB cable or IEEE 1394 interface (i.e., Firewire), a wireless communication technology such as TCP/IP 802.11 wireless networks, Bluetooth, GPRS, CDMA or other cellular data transmission networks, or any other computer-to-computer communications protocol. The media device manager application 312 notifies the MPA 302 when it detects a portable media device 116 connected to the client computer 310.

The MPA 302 executes in response to the notification from the media device manager application 312 and identifies all media files 304 on the computer 310 it can process, and transfers the identified files to the media library 306. If the MPA 302 is running when the user copies audio files from a CD, the Internet, or other source, the audio files are automatically directed to the media library 304 for storage. The MPA 302 is responsive to the notification from the device manager 312 to display media files 304 in the media library 306 via the UI 308, and allows the user to view and edit the stored metadata, and/or to designate one or more media files to transfer to the detected portable device 116.

Figure 3B:
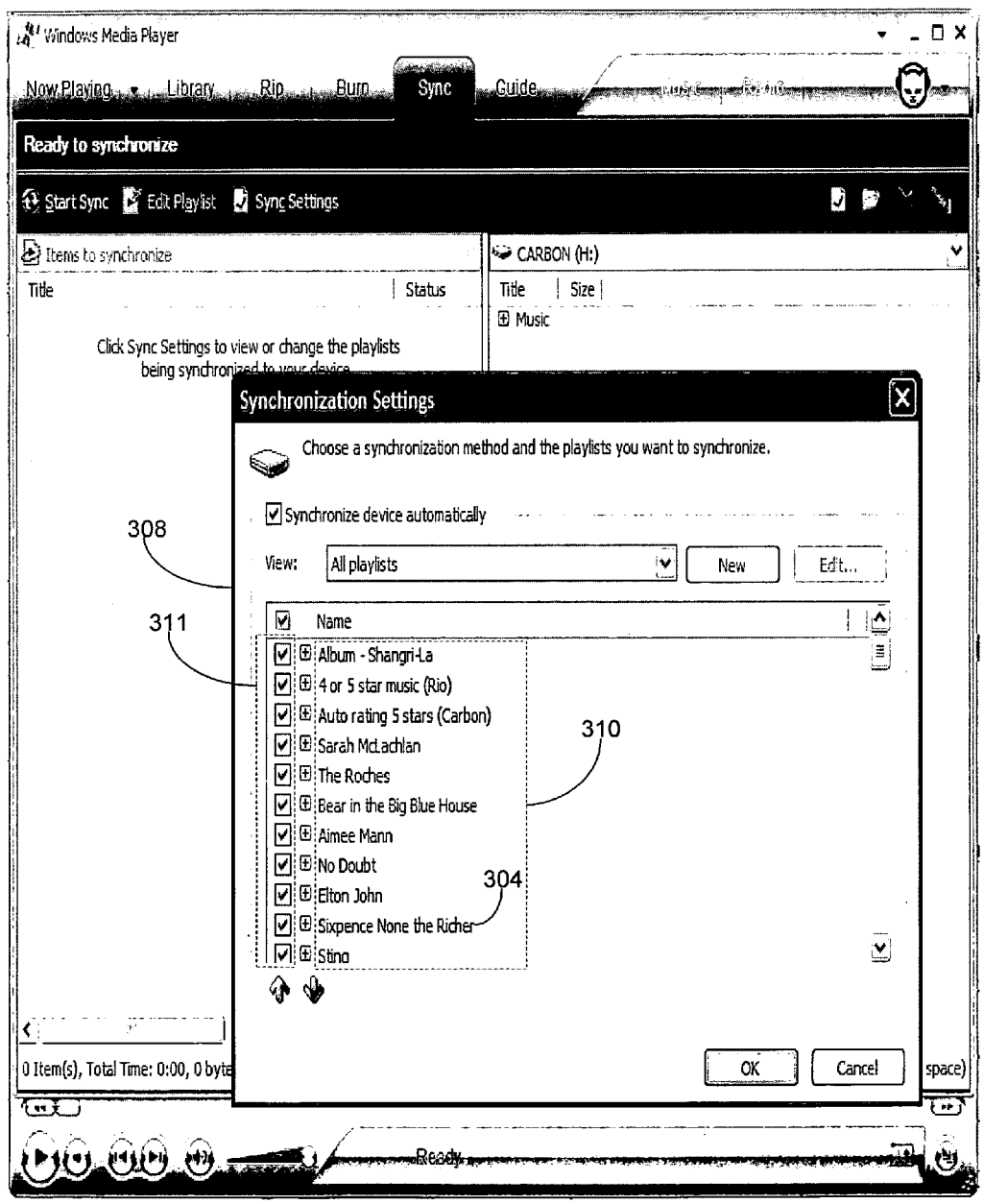
FIG. 3B is a screen shot of a graphical user interface provided by the media player application

Referring now to FIG. 3B, a screen shot illustrates an exemplary UI 308 for displaying media files 304 stored in the media library 306 of Windows Media® Player offered by Microsoft, Inc. The UI 308 displays a list of media files 304 in a media file data section 310, and the user designates media files to synchronize (i.e. transfer) to a portable media device 116. The user interacts with metadata and/or media files 304 being displayed via the UI 308 by using commonly known navigation techniques. For example, the user can use a mouse linked to the computer to navigate through the UI 308, and to select media files 304 by clicking a check box adjacent to a desired media file in a media file selection section 311. The UI 308 of the invention allows a user to designate a single media file or a group of media files for transfer by adding the media files to a transfer list. In this case, it can be seen that all the media files visible in the in the media file data section 310 have check in the check box adjacent to the media files, and, thus, are all designated for transfer to the portable media device 116.

Referring back to FIG. 3A, after the user designates one or more media files 304 via the UI 308 for transfer to the portable media device 116, the MPA 302 authenticates the portable media device 116. In one preferred embodiment, two levels of authentication must be satisfied before media files 304 and corresponding album art are transferred to the portable device 116. More specifically, the MPA 302 executes first and second authentication instructions 312, 314 to authenticate the portable media device 116.

The first authentication instructions 312 determine if the portable media device 116 supports Digital Rights Management (DRM) such as Windows Media Digital Rights Management 10 for Portable Devices (WMDRM10-PD), codenamed "Janus," offered by Microsoft, Inc. For example, the first authentication instructions 312 query the memory (not shown) of the portable device 116 to determine if it has a valid DRM certificate. If the device 116 does not have a valid DRM certificate, an otherwise unprotected media file 304 will be transferred to the portable media device 116. However, premium metadata such as album art will not be transferred to portable media device 116.

If the first authentication instructions 312 determine the portable media device 116 supports DRM, second authentication instructions 314 are executed by the MPA 302 to determine if the portable media device 116 is capable of displaying album art. For example, the second authentication instructions 314 include instructions for querying data stored in the memory (not shown) of a portable media device 116 to retrieve a value of the capability property. Generally, the value of the capability property is assigned by the manufacturer of the portable device 116 and indicates whether or not the device is capable of displaying premium property data such as album art. For instance, if the portable media device 116 is capable of displaying album art on the display of the portable media device 116, the manufacturer assigns a value to the capability property that indicates the portable media device 116 is configured to display album art. Alternatively, if the portable media device 116 is incapable of displaying album art on the display of the portable media device 116, a value is assigned to the capability property that indicates the portable media device 116 is not configured to display album art. If the retrieved capability property value indicates the portable media device 116 is configured to display album art, the portable media device 116 is authenticated for the transfer of album art. On the other hand, if the retrieved capability property value indicates the portable media device is not configured to display album art, the portable device is not authenticated for the transfer of album art. Accordingly, even if the device has a valid DRM certificate, the device 119 may not be capable or desire to receive transmission of album art.

Notably, although the authentication process is described above as occurring after the user identifies media files and/or data to transfer from the computer 310 to the portable media device 116, it is contemplated that authentication may occur when the device is first detected by the media device manager application 311. For example, when the media device manager application 311 detects a portable media device 116 connected to the client computer 310, the MPA 302 executes the first authentication instructions 312 to determine whether the device has a valid DRM certificate, and executes second authentication instructions 314 to identify the value of a capability property stored on the portable media device 116.

The media player application 302 executes transferring instructions 316 to transfer the appropriate data to the portable media device 116 based on the results of the authentication process described above. If the portable media device 116 is determined not to have a valid DRM certificate or not to have the capability to display album art (i.e., fails either the first or second levels of authentication), transferring instructions 316 only transfer the selected media file 304 and basic property data such as album title, artist, performer, genre, description of content. On the other hand, if the portable media device 116 is completely authenticated (i.e., satisfies first and second levels of authentication), the MPA 302 executes transferring instructions 316 to initiate the synchronization process and transfer a copy of the requested media file 304 and appropriate property data such as album art to the portable media device 116. In this case, the transferring instructions 316 include instructions for querying the media files 304 on the portable media device 116 to determine if an album object corresponding to the retrieved album art is stored on the portable media device 116. In one embodiment, the MPA 302 queries the memory of portable media device 116 to identify a unique identification code (UID) that matches a UID stored in the memory (e.g., library 306) of the MPA 302. The UID is a unique code generated by the portable media device 116. If matching UIDs are not identified, the MPA 302 executes creating instructions 318 to create an empty album object and requests the portable media device 116 to generate a corresponding UID. As described above in reference to FIG. 2B, the created album object includes metadata for each media file on an album such as album name, artist name, and premium metadata such as album art. The UID is generated by the portable media device 116 and associated with the album object directly by the device 116. The transferring instructions store the media file to the device, get a UID for the media file, and then set a reference in the album object using the UID of the media file just added. During playback of the media file 304 on the portable media device 116, metadata in header of the media file 304 is compared to data stored in one or more album objects to identify the album to which the media file 304 belongs and to retrieve the appropriate album art for display.

In one embodiment, the album object is created by the portable media device 116 and stored in a particular folder hierarchy which is calculated by an algorithm as a function of metadata associated with the track. For example, a music track will be stored in a folder hierarchy in the following form:

\Music\<artist name>\<album name>.

Moreover, other tracks (i.e., media files 304) for a particular album are also stored in this location, as is the album object itself. Similarly, other video type media such as television shows are stored in \TV\<Series name>, and similar hierarchies exist for still photos and non-television video. When an album object is created, the name of the object is similarly determined by the MPA 302 via an algorithm. For example, using the metadata discussed above in reference to FIG. 1C, the following name is determined for an album object, "10000Maniacs_InMyTribe.alb" where whitespace and illegal characters are removed, the artist name and album name are concatenated, and a alb extension is added, and this album object is created in the appropriate album directory as described by the hierarchy.

Accordingly, the determination of whether an album object already exists when transferring subsequent media files 304 can be managed by searching for the appropriately named ".alb" object in the directory, in which it is expected to be stored, by running the same algorithm each time. If the album object already exists, then the new media files 304 are added to the album objects by adding references to the UID(s) generated by the portable media device 116 for each new track or tracks. Thus, the existence of the album object can either be determined by locating it using a previously generated UID stored within the MPA's media library, or by running a deterministic algorithm such as described above.

If transferring instructions 316 determine if an album object designating the album art for the media file being transferred already exists on the portable media device 116, then the transferring instructions 316 transfer the media file 304 to portable media device 116 without album art data. That is, because metadata associated with the media file 304 being transferred and the metadata associated with the album object identify the same album, there is no need to transfer album art to the portable media device 116. For example, since both the media file 304 and the album object include album name property data, the MPA 302 queries album object data stored on the portable media device 116 to determine if the album name property data included in the media file being transferred matches album name property data included in any of the album art object data stored on the portable media device 116. If there is a match, a reference to the UID and the new media file is added to the existing album object.

In another embodiment, rather than comparing the album name property data of the media file 304 and the album object to determine if the album object exist on the portable media device, the MPA 302 queries album object data stored on the portable media device 116 to determine if a UID of an album object stored on in the memory of the MPA a matches a UID of an album object stored in the memory of the portable media device 116. As a result, matching problems that occur, for example, when the album name or artist name is edited on the desktop computer's media library between synchronizations can be avoided since the UID cannot be changed by the user.

In one preferred embodiment, the transfer instructions 314 further include instructions for comparing property data of media files 304 stored on the client computer 310 to property data of media files 304 stored on the portable media device 116 to determine if there have been any changes or updates to media files 304 previously transferred to the portable media device 116. For example, the transferring instructions 316 compares values of property data such as a rating of a particular media file or a play count of a particular media file as stored on the portable media device 116 to corresponding vales of such property data stored on the client computer 310 to determine if the property data has changed since the portable media device 116 was last synchronized with the client computer 310. The rating of the album refers to a rating assigned by the user to a particular media file on the portable media device 116. The play count represents the number of times the particular media file has been played on the portable media device 116 since it was last synced with the MPA 302. The MPA 302 processes any changes to such data to the local media library 306 to insure the media library 306 has the user's current preferences. The transferring instructions 316 further compare media files stored on the portable media device 116 to the media files 304 stored on the client computer 310 to determine if media files have been added to or deleted from the portable media device 116 since the portable media device 116 was last synced with the client computer 310.

The transferring instructions 316 further include instructions for determining a value of a buy property. The buy property value indicates whether or not the user desires to purchase an audio CD corresponding to a transferred media file and/or premium property data and is assigned by the user of the portable media device 116. For instance, a DRM requirement for transferring album art requires the portable media device 116 to display a buy experience to the user. For example, a "Buy" button is displayed along with the album art on the display of the portable media device 116. If the user of the portable media device 116 selects or clicks the "Buy" button, a buy value is assigned to the buy property to indicate that the user desires to purchase the audio CD. The transferring instructions query data stored in the memory of the portable media device 116 media to detect buy properties having a buy value. If a buy value is detected, the MPA 302 communicates with the server 118 via the Internet 120 to display a web page (not shown) that allows the user to purchase the corresponding audio CD.

Figure 4:
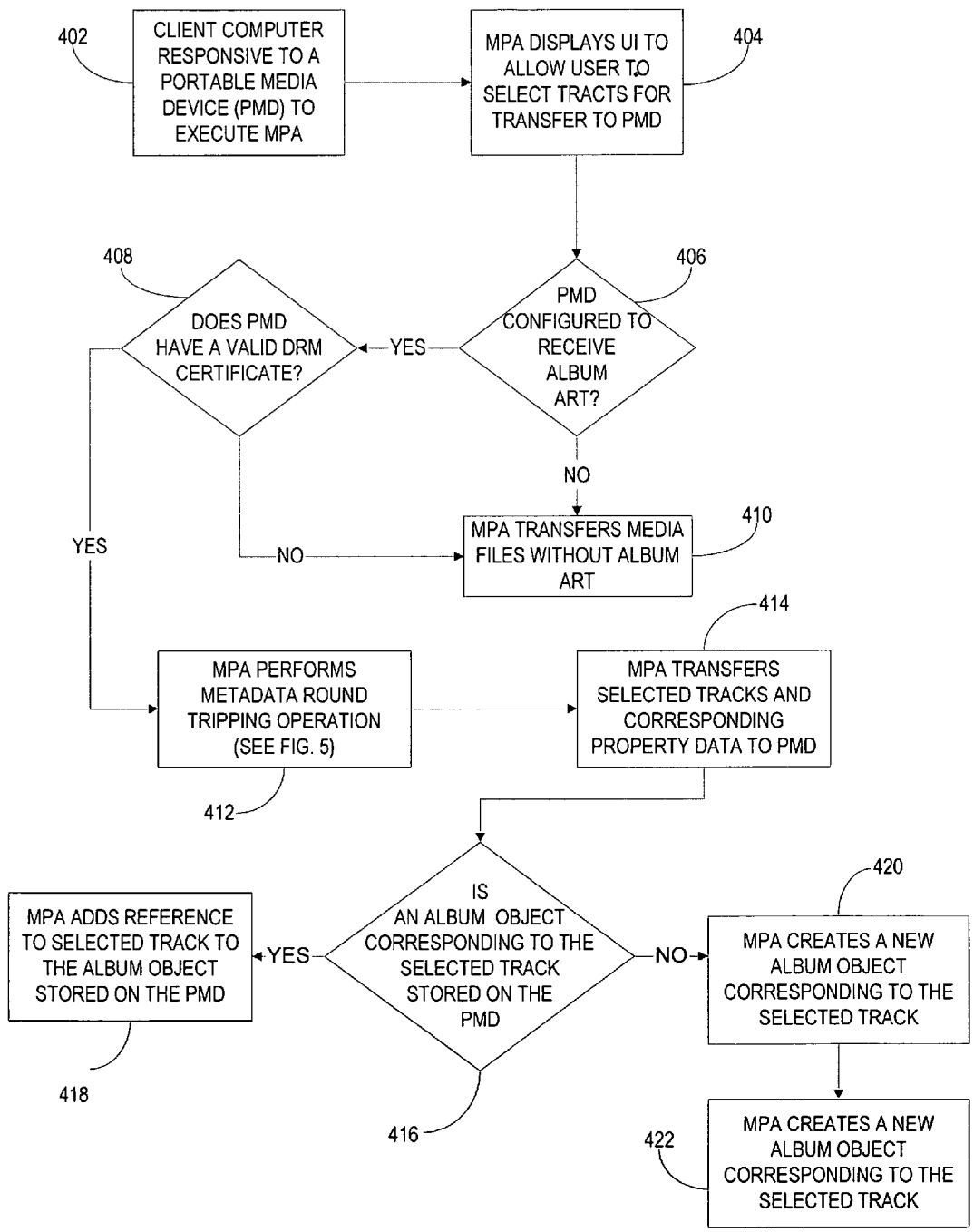
FIG. 4 is an exemplary flow chart illustrating a method of transferring graphical information from a client computer to a portable media device according to one embodiment of the invention.

Referring now to FIG. 4, an exemplary flow chart illustrates a method of transferring graphical information such as album art from a client computer 102 connected to a portable media device 116 according to the embodiment shown in FIG. 1. At 402, the client computer 102 is responsive to the connected portable media device 116 to execute a MPA 104. The user, using navigation techniques such as described above, selects a track (i.e., media file 106) being displayed via graphical user interface 112 for transfer to the portable media device 116 at 404. At 406, the MPA 104 determines whether the portable media device 116 is configured (i.e., capable) to display album art. For example, as described above the MPA 104 communicates with the portable media device 116 to identify a value of a capability property that is stored on the portable media device 116 and that indicates whether or not the device 116 is capable of receiving premium property data such as album art. If the MPA 104 verifies that the portable media device 116 is capable to receive album art at 406, the MPA 104 queries the memory of the portable media device 116 for a valid DRM certificate to determine if the portable media device 116 supports DRM at 408. If the MPA 104 determines that the portable media device 116 is not capable of receiving album art at 406, or determines that the portable media device 116 does not support DRM at 408, the MPA 104 transfers the selected media file 106 without album art at 410. If the MPA 104 determines that the portable media device 116 is capable of receiving album art at 406, and determines that the portable media device 116 does support DRM at 408, the MPA 104 performs a metadata round-tripping operation between the portable media device 116 and the computer 102 to incorporate any metadata updates since the last synching operation at 412. (See FIG. 5). At 414, MPA 104 transfers the selected track and track property data (e.g., album name, album artist, track rating, and play count) to the portable media device 116. The MPA 104 queries data stored in a memory of the portable media device 116 to determine if an album object corresponding to the selected track is stored in the memory of the portable media device at 416. If the MPA 104 determines that an album object corresponding to the selected track is already stored in the memory of the portable media device 116 at 416, then the MPA 104 adds a reference to the selected track to the album object stored on the portable media device 116 at 418. If the MPA 104 determines that an album object corresponding to the selected track is not stored in the memory of the portable media device 116 at 416, the MPA creates a new album object storing album art corresponding to the selected track as premium property data, track property data such as described above, and a reference to the selected track to the portable media device at 420. At 422, MPA 104 transfers the new album object to the portable media device 116.

Figure 5:
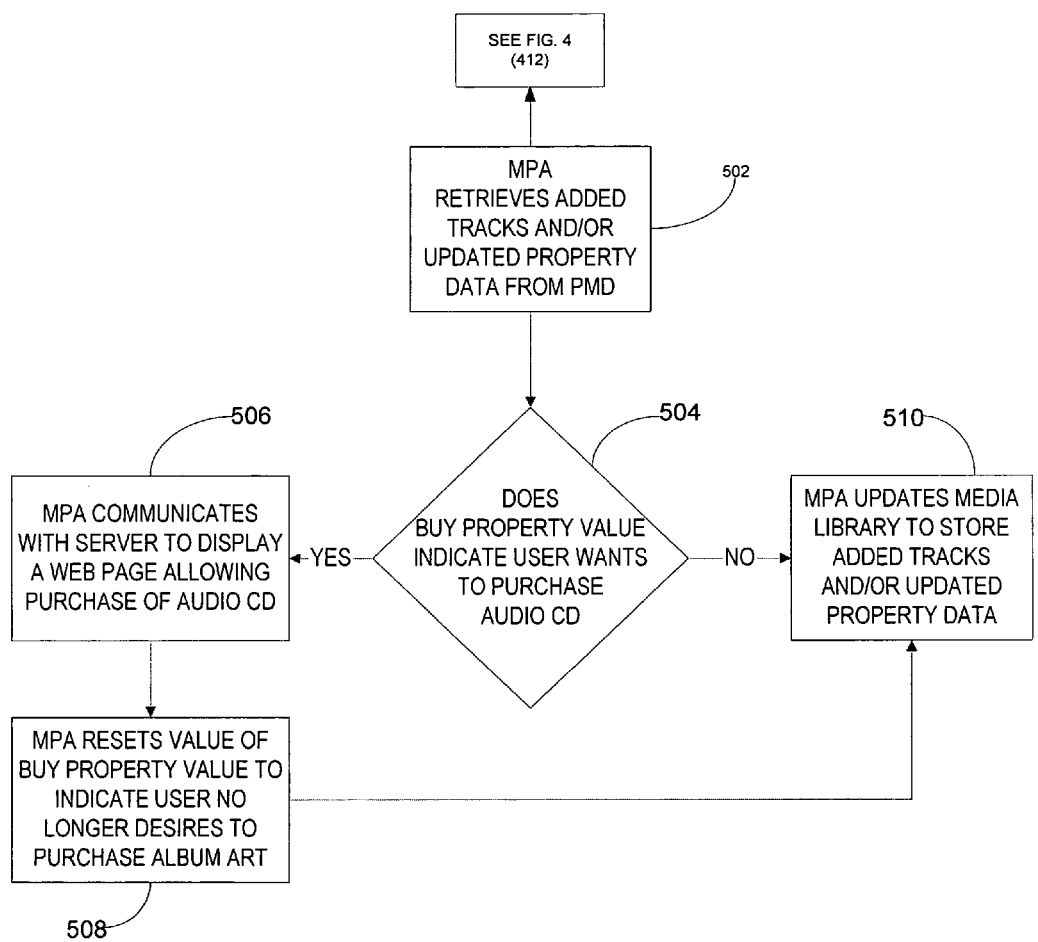
FIG. 5 is a flow chart illustrating a metadata round tripping operation between a portable device and a computer according to one embodiment of the invention.

Referring now to FIG. 5, an exemplary flow chart illustrates a metadata round tripping operation between the portable media device 116 and the computer according to one embodiment of the invention. After MPA 104 determines that the portable media device 116 is capable of receiving album art and supports DRM (See FIGS. 4, 406 and 408), the MPA 104 retrieves media files and/or property data of media files from the portable medium device 116 that have been updated or changed since the computer 1002 was last synced with the portable media device 116 at 502. For example, the device is responsive to a request from the MPA 104 for updated metadata to transfer new media files added since the computer 102 was last synced with the portable media device 116. As another example, the portable media device 116 is responsive to a request from the MPA 104 for updated metadata and/or to transfer property data such as a rating of a particular track, a play count of a particular track, or the value of a Buy property that has changed since the computer was last synced with the device. At 504, the MPA 104 processes the value of the Buy property retrieved at 502 to determine if the user of the portable media device 116 desires to purchase the audio CD. If the MPA 104 determines that the value of the retrieved Buy property indicates the user desires to purchase the audio CD at 504, the MPA 104 communicates with the server 118 via the Internet 120 to display a web page (not shown) that allows the user to purchase the corresponding audio CD at 506. At 508 the MPA 104 resets the value of the Buy property, and transfers the reset Buy property to the device so the user is not presented with redundant purchase opportunities during a subsequent synching operation. The MPA 104 processes changes to the other property data retrieved from the device to the local memory 110 (e.g., media library 306) to insure the memory 110 of the MPA 104 has the user's current preferences at 510. Alternatively, if the MPA 104 determines that the value of the retrieved Buy property does not indicate the user desires to purchase the audio CD at 504, the MPA 302 processes changes to the other property data retrieved from the device to the memory 110 to at 510.

Figure 6:
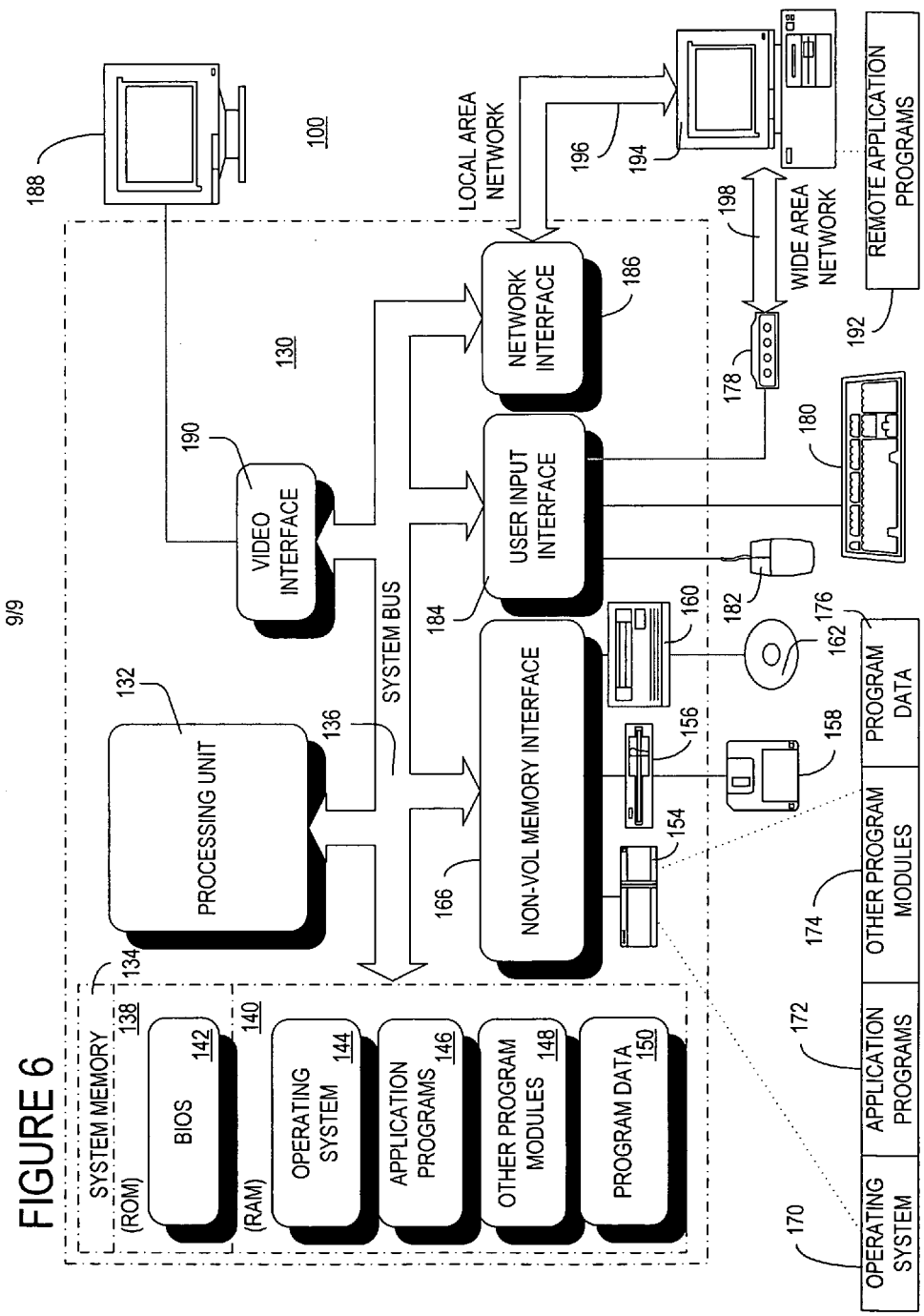
FIG. 6 is a block diagram illustrating one example of a suitable computing system environment in which the invention may be implemented.

FIG. 6 shows one example of a general purpose computing device in the form of a computer 130. In one embodiment of the invention, a computer such as the computer 130 is suitable for use in the other figures illustrated and described herein. Computer 130 has one or more processors or processing units 132 and a system memory 134. In the illustrated embodiment, a system bus 136 couples various system components including the system memory 134 to the processors 132. The bus 136 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 130 typically has at least some form of computer readable media. Computer readable media, which include both volatile and nonvolatile media, removable and non-removable media, may be any available medium that may be accessed by computer 130. By way of example and not limitation, computer readable media comprise computer storage media and communication media. Computer storage media include volatile and nonvolatile, removable and non-removable media implemented in any method or technology for storage of information such as computer readable instructions, data structures, program modules or other data. For example, computer storage media include RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium that may be used to store the desired information and that may be accessed by computer 130. Communication media typically embody computer readable instructions, data structures, program modules, or other data in a modulated data signal such as a carrier wave or other transport mechanism and include any information delivery media. Those skilled in the art are familiar with the modulated data signal, which has one or more of its characteristics set or changed in such a manner as to encode information in the signal. Wired media, such as a wired network or direct-wired connection, and wireless media, such as acoustic, RF, infrared, and other wireless media, are examples of communication media. Combinations of any of the above are also included within the scope of computer readable media.

The system memory 134 includes computer storage media in the form of removable and/or non-removable, volatile and/or nonvolatile memory. In the illustrated embodiment, system memory 134 includes read only memory (ROM) 138 and random access memory (RAM) 140. A basic input/output system 142 (BIOS), containing the basic routines that help to transfer information between elements within computer 130, such as during start-up, is typically stored in ROM 138. RAM 140 typically contains data and/or program modules that are immediately accessible to and/or presently being operated on by processing unit 132. By way of example, and not limitation, FIG. 6 illustrates operating system 144, application programs 146, other program modules 148, and program data 150.

The computer 130 may also include other removable/non-removable, volatile/nonvolatile computer storage media. For example, FIG. 6 illustrates a hard disk drive 154 that reads from or writes to non-removable, nonvolatile magnetic media. FIG. 6 also shows a magnetic disk drive 156 that reads from or writes to a removable, nonvolatile magnetic disk 158, and an optical disk drive 160 that reads from or writes to a removable, nonvolatile optical disk 162 such as a CD-ROM or other optical media. Other removable/non-removable, volatile/nonvolatile computer storage media that may be used in the exemplary operating environment include, but are not limited to, magnetic tape cassettes, flash memory cards, digital versatile disks, digital video tape, solid state RAM, solid state ROM, and the like. The hard disk drive 154, and magnetic disk drive 156 and optical disk drive 160 are typically connected to the system bus 136 by a non-volatile memory interface, such as interface 166.

The drives or other mass storage devices and their associated computer storage media discussed above and illustrated in FIG. 6, provide storage of computer readable instructions, data structures, program modules and other data for the computer 130. In FIG. 6, for example, hard disk drive 154 is illustrated as storing operating system 170, application programs 172, other program modules 174, and program data 176. Note that these components may either be the same as or different from operating system 144, application programs 146, other program modules 148, and program data 150. Operating system 170, application programs 172, other program modules 174, and program data 176 are given different numbers here to illustrate that, at a minimum, they are different copies.

A user may enter commands and information into computer 130 through input devices or user interface selection devices such as a keyboard 180 and a pointing device 182 (e.g., a mouse, trackball, pen, or touch pad). Other input devices (not shown) may include a microphone, joystick, game pad, satellite dish, scanner, or the like. These and other input devices are connected to processing unit 132 through a user input interface 184 that is coupled to system bus 136, but may be connected by other interface and bus structures, such as a parallel port, game port, or a Universal Serial Bus (USB). A monitor 188 or other type of display device is also connected to system bus 136 via an interface, such as a video interface 190. In addition to the monitor 188, computers often include other peripheral output devices (not shown) such as a printer and speakers, which may be connected through an output peripheral interface (not shown).

The computer 130 may operate in a networked environment using logical connections to one or more remote computers, such as a remote computer 194. The remote computer

194 may be a personal computer, a server, a router, a network PC, a peer device or other common network node, and typically includes many or all of the elements described above relative to computer 130. The logical connections depicted in FIG. 6 include a local area network (LAN) 196 and a wide area network (WAN) 198, but may also include other networks. LAN 136 and/or WAN 138 may be a wired network, a wireless network, a combination thereof, and so on. Such networking environments are commonplace in offices, enterprise-wide computer networks, intranets, and global computer networks (e.g., the Internet).

When used in a local area networking environment, computer 130 is connected to the LAN 196 through a network interface or adapter 186. When used in a wide area networking environment, computer 130 typically includes a modem 178 or other means for establishing communications over the WAN 198, such as the Internet. The modem 178, which may be internal or external, is connected to system bus 136 via the user input interface 184, or other appropriate mechanism. In a networked environment, program modules depicted relative to computer 130, or portions thereof, may be stored in a remote memory storage device (not shown). By way of example, and not limitation, FIG. 6 illustrates remote application programs 192 as residing on the memory device. The network connections shown are exemplary and other means of establishing a communications link between the computers may be used.

Generally, the data processors of computer 130 are programmed by means of instructions stored at different times in the various computer-readable storage media of the computer. Programs and operating systems are typically distributed, for example, on floppy disks or CD-ROMs. From there, they are installed or loaded into the secondary memory of a computer. At execution, they are loaded at least partially into the computer's primary electronic memory. The invention described herein includes these and other various types of computer-readable storage media when such media contain instructions or programs for implementing the steps described below in conjunction with a microprocessor or other data processor. The invention also includes the computer itself when programmed according to the methods and techniques described herein.

For purposes of illustration, programs and other executable program components, such as the operating system, are illustrated herein as discrete blocks. It is recognized, however, that such programs and components reside at various times in different storage components of the computer, and are executed by the data processor(s) of the computer.

Although described in connection with an exemplary computing system environment, including computer 130, the invention is operational with numerous other general purpose or special purpose computing system environments or configurations. The computing system environment is not intended to suggest any limitation as to the scope of use or functionality of the invention. Moreover, the computing system environment should not be interpreted as having any dependency or requirement relating to any one or combination of components illustrated in the exemplary operating environment. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, mobile telephones, network PCs, minicomputers, mainframe computers, distributed computing environments that include any of the above systems or devices, and the like.

The invention may be described in the general context of computer-executable instructions, such as program modules, executed by one or more computers or other devices. Generally, program modules include, but are not limited to, routines, programs, objects, components, and data structures that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

An interface in the context of a software architecture includes a software module, component, code portion, or other sequence of computer-executable instructions. The interface includes, for example, a first module accessing a second module to perform computing tasks on behalf of the first module. The first and second modules include, in one example, application programming interfaces (APIs) such as provided by operating systems, component object model (COM) interfaces (e.g., for peer-to-peer application communication), and extensible markup language metadata interchange format (XMI) interfaces (e.g., for communication between web services).

The interface may be a tightly coupled, synchronous implementation such as in Java 2 Platform Enterprise Edition (J2EE), COM, or distributed COM (DCOM) examples. Alternatively or in addition, the interface may be a loosely coupled, asynchronous implementation such as in a web service (e.g., using the simple object access protocol). In general, the interface includes any combination of the following characteristics: tightly coupled, loosely coupled, synchronous, and asynchronous. Further, the interface may conform to a standard protocol, a proprietary protocol, or any combination of standard and proprietary protocols.

The interfaces described herein may all be part of a single interface or may be implemented as separate interfaces or any combination therein. The interfaces may execute locally or remotely to provide functionality. Further, the interfaces may include additional or less functionality than illustrated or described herein.

In operation, computer 130 executes computer-executable instructions such as those illustrated in FIG. 3 to transfer graphical information from a client computer to a portable media device or remote computer.

The order of execution or performance of the methods illustrated and described herein is not essential, unless otherwise specified. That is, elements of the methods may be performed in any order, unless otherwise specified, and that the methods may include more or less elements than those disclosed herein. For example, it is contemplated that executing or performing a particular element before, contemporaneously with, or after another element is within the scope of the invention.

When introducing elements of the present invention or the embodiment(s) thereof, the articles "a," "an," "the," and "said" are intended to mean that there are one or more of the elements. The terms "comprising," "including," and "having" are intended to be inclusive and mean that there may be additional elements other than the listed elements.

In view of the above, it will be seen that the several objects of the invention are achieved and other advantageous results attained.

As various changes could be made in the above constructions and methods without departing from the scope of the invention, it is intended that all matter contained in the above description and shown in the accompanying drawings shall be interpreted as illustrative and not in a limiting sense.

What is claimed is:

1. A computer storage medium having computer executable instructions for transferring information from a client computer to a portable media device comprising:
   a user interface on the client computer for identifying a track to be transferred to the portable media device, said identified track being part of an album, said album having an album art associated therewith;
   instructions for retrieving information corresponding to the identified track; instructions for establishing a connection between the client computer and the portable media device;
   instructions for determining whether an object is stored in the portable media device, said object, being stored on the client computer, storing property data corresponding to the identified track and the retrieved information and designating the album art portion of the property data of the identified track to indicate that the identified track belongs to the album represented by the album art;
   instructions for creating the object when the determining indicates that the object is not stored in the portable media device;
   instructions for transferring the designated album art portion of the created object and identified track from the client computer to the portable media device when the determining indicates that the object is not stored in the portable media device, wherein the instructions for determining includes instructions for comparing property data included in the identified track to property data included in an existing object stored on the portable media device, said property data included in the identified track including a unique identification code, said property data included in the existing object stored on the portable media device including another unique identification codes, wherein the instructions for transferring comprise transferring the created object to the portable media device responsive to the instructions for determining indicating that the property data included in the identified track does not match property data included in the existing object stored in the portable media device;
   wherein the portable media device disconnects from the client computer and the portable media device plays the identified track and interacts with a user;
   while the portable media device is disconnected from the client computer, instructions for searching, by the portable media device, the property data stored in the portable media device to identify a buy indication to buy the album in the portable media device associated with the identified track of the album, said buy indication being selected by the user while the portable media device plays the identified track;
   upon reconnecting with the client computer, instructions for transferring information indicative of the identified buy indication from the portable media device to the client computer; and
   instructions for activating a second user interface on the client computer which presents the user with an option to buy the associated album when the buy indication is identified in response to the transferred information from the portable media device, said option including connecting the user from the client computer to a web site authorized to sell the associated album.

2. The computer storage medium of claim 1 wherein the transferring includes transferring the identified track when the determining indicates that the object is stored in the portable media device and associating the object stored in the portable media device to the transferred track.

3. The computer storage medium of claim 1 wherein the retrieving information includes retrieving graphical information and/or textual information for the identified track from a data source.

4. The computer storage medium of claim 1 wherein the identified track includes property data, said property data identifying
   an album name;
   an artist name;
   a track title;
   a track duration
   a play count; and
   a track rating.

5. The computer storage medium of claim 1 wherein determining further comprises authenticating the portable media device prior to transferring information, said authenticating including:
   determining if the portable media device supports Digital Rights Management (DRM), and
   determining whether the portable media device is configured to receive information.

6. The computer storage medium of claim 1 further including instructions for comparing track data stored in a library of the client computer to track data stored in the portable media device to identify tracks or track data stored on the portable media device and not listed in the library, and transferring the identified tracks or track data to the client computer, or for comparing data stored in the portable media device to data stored in the library of the client computer to identify tracks previously transferred to the portable media device that have been deleted from the portable media device since a last transfer of tracks or track data between the client computer and the portable media device.

7. The computer storage medium of claim 5 wherein said authenticating determines if the portable media device supports Digital Rights Management (DRM) by searching the portable media device for a valid DRM certificate, and wherein said authenticating determines if the portable media device supports display of information by searching property data store in the portable media device for a value of a capability property indicating the device is configured to receive information.

8. A method for transferring information from a client computer to a remote computer comprising:
   presenting a user interface on the client computer for identifying a media file to be transferred to the remote computer, said media file comprises a media track belonging to an album, said remote computer being a portable media device, said media file having a metadata field that includes property data associated with the album;
   retrieving information corresponding to the identified media file; establishing a connection between the client computer and the remote computer;
   determining whether an object, being first stored on the client computer, is stored in the remote computer, said object storing property data corresponding to the identified media file and the retrieved information and designating the album art portion of the album of the identified media file to indicate that the identified media file belongs to the album represented by the album art;
   creating the object when the determining indicates that the object is not stored in the remote computer;
   transferring the designated portion of the created object and identified media file from the client computer to the remote computer when the determining indicates that the object is not stored in the remote computer, wherein the determining includes comparing property data included in the identified media file on the client computer to property data included in an existing object stored on the remote computer, said property data included in the identified media file including a unique identification code, said property data included in the existing object including another unique identification codes, wherein the transferring comprise transferring the created object to the remote computer responsive to the determining indicating that the property data included in the identified media file does not match property data included in the existing object stored in the remote computer;

disconnecting the remote computer from the client computer, wherein the remote computer is capable to interact with a user and to play the identified media file on the remote computer;

while the remote computer is disconnected from the client computer, searching, on the remote computer, the property data stored in the remote computer to identify a buy indication to buy the album in the remote computer associated with the identified track of the album, said buy indication being selected by the user while the remote computer plays the identified media file;

reconnecting the remote computer with the client computer;

transferring information indicative of the identified buy indication from the remote computer to the client computer; and activating a second user interface on the client computer which presents the user with an option to buy the associated album when the buy indication is identified in response to the transferred information from the remote computer, said option including connecting the user from the client computer to a web site authorized to sell the associated album.

9. The method of claim 8 wherein transferring includes transferring the identified media file when the determining indicates that the object is stored in the remote computer and associating the object stored in the remote computer to the transferred media file.

10. The method of claim 8 wherein the retrieving information includes retrieving album art data for the media file from an album art data source, said album art data including graphical and textual data.

11. The method of claim 8 wherein property data included in the metadata fields of the identified media file identifies one or more of the following:
an album name;
an artist name;
a track title;
a track duration;
a track play count; or
a track rating.

12. The method of claim 8 wherein the determining includes comparing property data included in the metadata field of the identified media file to property data included in an existing object stored on the remote computer, and wherein the created object is transferred to the remote computer when the determining indicates that the property data included in the metadata field of the identified media file does not match property data included in the existing object stored in the remote computer.

13. The method of claim 8 wherein determining further comprises authenticating the remote computer prior to transferring information, said authenticating including:
determining if the remote computer supports Digital Rights Management (DRM); and
identifying a value of a capability property on the remote computer to determine whether the remote computer is configured to receive information.

14. The method of claim 8 further including instructions for comparing first property data stored in the metadata fields of the media file stored in a memory of the computer to second property data stored in the metadata fields of the object to identify media files or metadata stored in the remote computer and not stored in the memory of the computer, and transferring the identified media file and metadata to the computer.

15. One or more computer storage media having stored thereon a searchable data structure comprising:
a first data field for storing data representing information associated with an album on a portable media device, said first field storing a partial information of the album; and
a second field for storing data representing one or more tracks associated with the album, and wherein the partial information included in the first field is associated with each of the one or more tracks stored in the second field, wherein the second field is associated with each of the one or more tracks stored in the second field, wherein the second field includes one or more unique media file pointers with each referencing a particular track of the album stored on the portable media device, wherein the first field and the second field store only the required data needed for the tracks to be rendered on the portable media device, wherein the second field stores a media file pointer that references a particular track of an album stored on the portable media device and the first field stores corresponding album art for the tracks of the album, wherein the second field stores property data, including a unique identification code for each of the one or more tracks on the portable media device, said unique identification code for each of the one or more tracks on the portable media device being used to transfer the data representing the one or more tracks from a source computer to the portable media device, and wherein during playback of the particular media file referenced by the media file pointer the portable media device displays the corresponding album art.

* * * * *

UNITED STATES PATENT AND TRADEMARK OFFICE
CERTIFICATE OF CORRECTION

PATENT NO. : 7,593,950 B2   Page 1 of 1
APPLICATION NO. : 11/094097
DATED : September 22, 2009
INVENTOR(S) : Silverman et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 200 days.

Signed and Sealed this

Twenty-eighth Day of September, 2010

David J. Kappos
*Director of the United States Patent and Trademark Office*